United States Patent
Ding et al.

(10) Patent No.: US 10,198,531 B2
(45) Date of Patent: *Feb. 5, 2019

(54) METHOD AND APPARATUS FOR PROLIFERATING TESTING DATA

(71) Applicant: International Business Machines Corporation, Armonk, NY (US)

(72) Inventors: Jian dong Ding, Shanghai (CN); Ning Duan, Beijing (CN); Guoqiang Hu, Shanghai (CN); Sheng Huang, Shanghai (CN); Jun Zhu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/597,197

(22) Filed: May 17, 2017

(65) Prior Publication Data

US 2017/0249398 A1 Aug. 31, 2017

Related U.S. Application Data

(63) Continuation of application No. 14/327,591, filed on Jul. 10, 2014, now Pat. No. 9,684,740.

(30) Foreign Application Priority Data

Jul. 30, 2013 (CN) .......................... 2013 1 0325671

(51) Int. Cl.
- *G06F 17/30* (2006.01)
- *G06F 11/36* (2006.01)
- *G06F 11/263* (2006.01)

(52) U.S. Cl.
CPC ...... *G06F 17/30979* (2013.01); *G06F 11/263* (2013.01); *G06F 11/36* (2013.01);
(Continued)

(58) Field of Classification Search
CPC .. G06F 17/30979; G06F 11/263; G06F 11/36; G06F 17/30424; G06F 17/30657; G06F 17/30929
(Continued)

(56) References Cited

U.S. PATENT DOCUMENTS 4,641,246 A * 2/1987 Halbert .............. G01R 31/2834
324/121 R
5,446,681 A * 8/1995 Gethner .............. G01N 21/359
702/27

(Continued)

FOREIGN PATENT DOCUMENTS

CN 101162426 A 4/2008
CN 102033806 A 4/2011
(Continued)

OTHER PUBLICATIONS

Deng et al., "Research on progress of automated software test data generation method", English Abstract only, Journal of Zhengzhou University of Light Industry (Natural Science), vol. 24, No. 4, Aug. 2009, 4 pages.

(Continued)

*Primary Examiner* — Frantz Coby
(74) *Attorney, Agent, or Firm* — Gilbert Harmon, Jr.

(57) ABSTRACT

Embodiments of the present invention provide information processing systems and methods for proliferating testing data based on sample testing data. In one embodiment, a difference is determined by comparing a desired query result to a query result acquired by executing a query statement on sample testing data. Sample testing data can then be proliferated based, at least in part, on the difference and data generation constraint conditions.

9 Claims, 5 Drawing Sheets

(52) U.S. Cl.
CPC .. *G06F 17/30424* (2013.01); *G06F 17/30657* (2013.01); *G06F 17/30929* (2013.01)

(58) Field of Classification Search
USPC ............... 707/692, 705, 791, 759, 761, 769
See application file for complete search history.

(56) References Cited

U.S. PATENT DOCUMENTS

| | | | |
|---|---|---|---|
| 5,664,173 A | | 9/1997 | Fast |
| 5,691,486 A | * | 11/1997 | Behringer .......... G01N 15/1404 422/540 |
| 6,205,407 B1 | * | 3/2001 | Testa ................ G01R 31/31830 702/119 |
| 7,349,919 B2 | * | 3/2008 | Russell ............. G06F 17/30598 |
| 7,584,455 B2 | * | 9/2009 | Ball .................... G06F 11/3676 717/124 |
| 7,805,447 B2 | | 9/2010 | Olston et al. |
| 7,861,226 B1 | * | 12/2010 | Episkopos .......... G06F 11/3696 717/124 |
| 7,984,031 B2 | | 7/2011 | Chordia et al. |
| 8,321,473 B2 | | 11/2012 | Symons et al. |
| 8,874,593 B2 | | 10/2014 | Unger et al. |
| 9,684,740 B2 | * | 6/2017 | Ding ................. G06F 17/30979 |
| 2006/0010426 A1 | * | 1/2006 | Lewis ................ G06F 11/3684 717/124 |
| 2007/0008217 A1 | * | 1/2007 | Yang ........................ G01S 19/24 342/357.68 |
| 2008/0010573 A1 | * | 1/2008 | Sul ................. G01R 31/318541 714/731 |
| 2008/0086660 A1 | | 4/2008 | Wefers |
| 2009/0282136 A1 | * | 11/2009 | Subramanian ............ G06F 8/30 709/222 |
| 2012/0215815 A1 | | 8/2012 | Clifford et al. |
| 2012/0290527 A1 | * | 11/2012 | Yalamanchilli ... G06F 17/30563 707/602 |
| 2012/0324289 A1 | | 12/2012 | Funnell |
| 2013/0139003 A1 | | 5/2013 | Patwardhan et al. |
| 2013/0185056 A1 | | 7/2013 | Ingram et al. |
| 2015/0039591 A1 | | 2/2015 | Ding et al. |

FOREIGN PATENT DOCUMENTS

| | | |
|---|---|---|
| CN | 102968374 A | 3/2013 |
| CN | 104346366 A | 2/2015 |

OTHER PUBLICATIONS

Feng et al., "Data generation method of database system test based on reverse query process", English Abstract only, Journal of Computer Applications, vol. 31, No. 4, Apr. 2011, 4 pages, doi: 10.3724/SP.J.1087.2011.00948.

Binnig, Carsten, "Generating Meaningful Test Databases", Inaugural—Dissertation, Universität Heidelberg, pp. I-VIII, 1-201, Apr. 15, 2008.

Erwig, Martin and Schneider, Markus, "STQL—A Spatio-Temporal Query Language", Chapter 6 of Mining Spatio-Temporal Information Systems, The Springer International Series in Engineering and Computer Science vol. 699, 2002, pp. 105-126.

Garcia D. and Millan M., "A Prototype of Synthetic Data Generator", pp. 1-6, (c) 2011 IEEE.

Khalek, Shadi Abdul and Khurshid, Sarfraz, "Systematic Testing of Database Engines Using a Relational Constraint Solver", 2011 Fourth IEEE International Conference on Software Testing, Verification and Validation, pp. 50-59, © 2011 IEEE.

Singh, Jaiteg and Singh, Kawaljeet, "Designing a Customized Test Data Generator for Effective Testing of a Large Database", 2008 International Conference on Advanced Computer Theory and Engineering, pp. 84-88, © 2008 IEEE.

"DTM Data Generator—Realistic data for dabase testing purposes", SQLEDIT, Copyright © 2004-2014 DTM soft, 3 pages, <http://www.sqledit.com/dg/>.

"TurboData", Turbo Computer Systems, Experts in Web site development, provided by inventors in disclosure on Jan. 22, 2013, retrieved from Internet Archive Wayback Machine, captured on Feb. 12, 2013, printed on May 22, 2014, 2 pages.

IBM, Appendix P, List of IBM Patents or Patent Applications Treated As Related, dated May 17, 2017, 2 pages.

* cited by examiner

METHOD AND APPARATUS FOR PROLIFERATING TESTING DATA

CROSS-REFERENCE TO RELATED PATENT APPLICATION(S)

The present application is a continuation of U.S. patent application Ser. No. 14/327,591, filed Jul. 10, 2014, which claims priority pursuant to 35 U.S.C. § 119 to Chinese Application No. 2013-10325671.0, filed Jul. 30, 2013, the entire contents of which are incorporated herein by reference.

TECHNICAL FIELD

The present invention relates to generation of testing data, and more specifically, to a method and information processing system for generating new testing data based on sample testing data.

BACKGROUND

Currently, we are in the era of big data. There is huge volume of data in many industries, such as transportation, electrical power, etc., and more applications continue to be developed with respect to such industrial data. During development, a large volume of testing data is needed for conducting functional tests on the applications. In practice, however, users typically can only provide a small amount of real sample data, and a developer often suffers from absence of real data.

Existing approaches for generating testing data typically take values randomly based on requirements such as value range, data type, etc. However, these approaches may only consider factors such as even distribution of data, comprehensive coverage, etc., and may not reflect complicated correlations or patterns of real physical data per se. For example, testing data may include fields for a staff number and age, where the staff number needs to be a unique integer value, and the age needs to be an integer value between 20-60. When generating 1000 pieces of record, the staff number may be randomly generated in an interval of 1-1000 and the age may be randomly generated in an interval of 20-60. However, such a data generation method does not support generation of data having complicated patterns or correlations. If new testing data is also generated randomly, the generated new testing data may be made impractical, such that it can not be applied in testing of an application.

SUMMARY

According to a first aspect of the present invention, there is provided a method for proliferating testing data, the method comprising: acquiring, using a processor device, a testing data requirement represented by a query statement and a desired query result; executing, using a processor device, the query statement on sample testing data to acquire a real query result, and recording intermediate results of respective query sub-operations during execution of the query statement; determining, using a processor device, a difference by comparing the desired query result and the real query result; and executing, using a processor device, respective data generation sub-operations corresponding to respective query sub-operations in an order that is reverse to an execution order of the query statement, and proliferating the sample testing data in the respective data generation sub-operations based on the difference, the intermediate results and data generation constraint conditions corresponding to respective fields in the sample testing data, wherein at least one of the data generation constraint conditions reflects a specific pattern of a corresponding field.

According to a second aspect of the present invention, there is provided an information processing system for proliferating testing data comprising a memory, a processor communicatively coupled to the memory, and one or more modules in the memory configured to perform steps comprising: acquiring a testing data requirement represented by a query statement and a desired query result; executing the query statement on sample testing data to acquire a real query result, and recording intermediate results of respective query sub-operations during execution of the query statement; determining a difference by comparing the desired query result and the real query result; and executing respective data generation sub-operations corresponding to respective query sub-operations in an order that is reverse to an execution order of the query statement, and proliferating the sample testing data in the respective data generation sub-operations based on the difference, the intermediate results and data generation constraint conditions corresponding to respective fields in the sample testing data, wherein at least one of the data generation constraint conditions reflects a specific pattern of a corresponding field.

With the methods and information processing systems of the invention, sample testing data is proliferated according to data generation constraint conditions corresponding to respective fields in sample testing data, and, since at least one data generation constraint condition reflects a specific pattern of a corresponding field, the generated new testing data can also comply with a certain specific pattern of the sample data.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference number generally refers to the same components in the embodiments of the present disclosure.

DETAILED DESCRIPTION

Embodiments of the present invention recognize a need to generate testing data based on existing sample data to satisfy requirements of functional tests. Embodiments of the present invention also recognize a need for improved testing data generation testing data generation schemes, as existing testing data generation schemes typically do not take into account the internal relationships of data and cannot reflect correlations and patterns in the data. In one embodiment of the present invention, testing data that satisfies user requirements is generated by proliferating a smaller sample data set. A user requirement is defined by a combination of a query on the sample data and the desired query result. The query on the sample data is processed and intermediate results of the query processing are recorded. A desired query result is compared to results of the query on the sample data and, if a gap exists, sample testing data is proliferated based, at least in part, on the difference and data generation constraint conditions.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
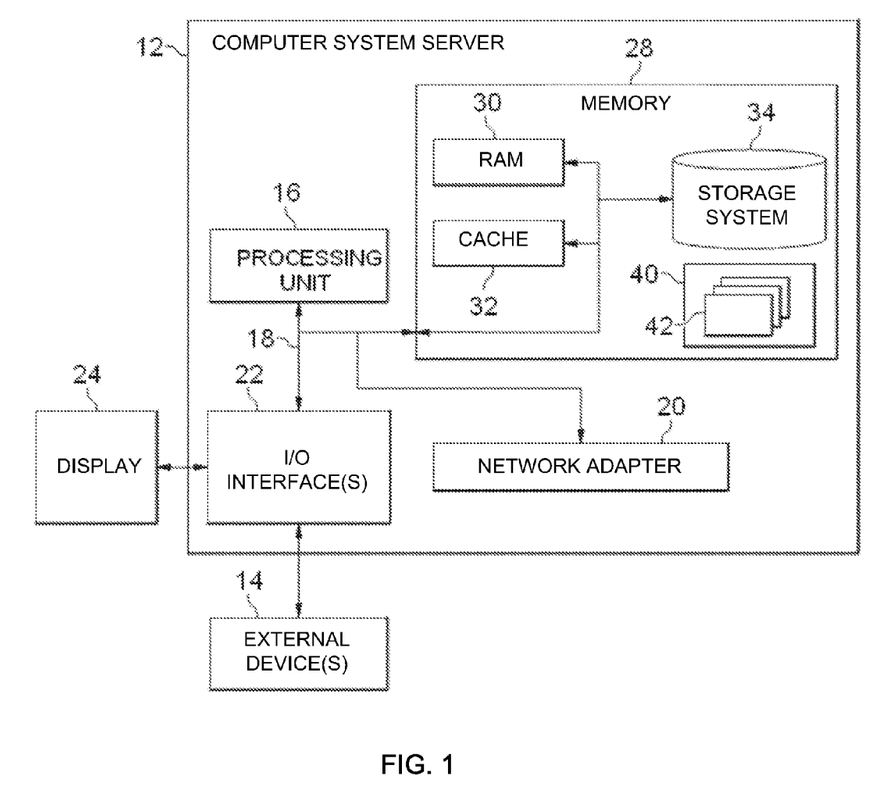
FIG. 1 shows a block diagram of an exemplary computer system 12 which is applicable to implement embodiments of the present invention.

Referring now to FIG. 1, in which a diagram of an exemplary computer system 12 which is applicable to implement the embodiments of the present invention is shown. Computer system 12 is only illustrative and is not intended to suggest any limitation as to the scope of use or functionality of embodiments of the invention described herein.

As shown in FIG. 1, computer system 12 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
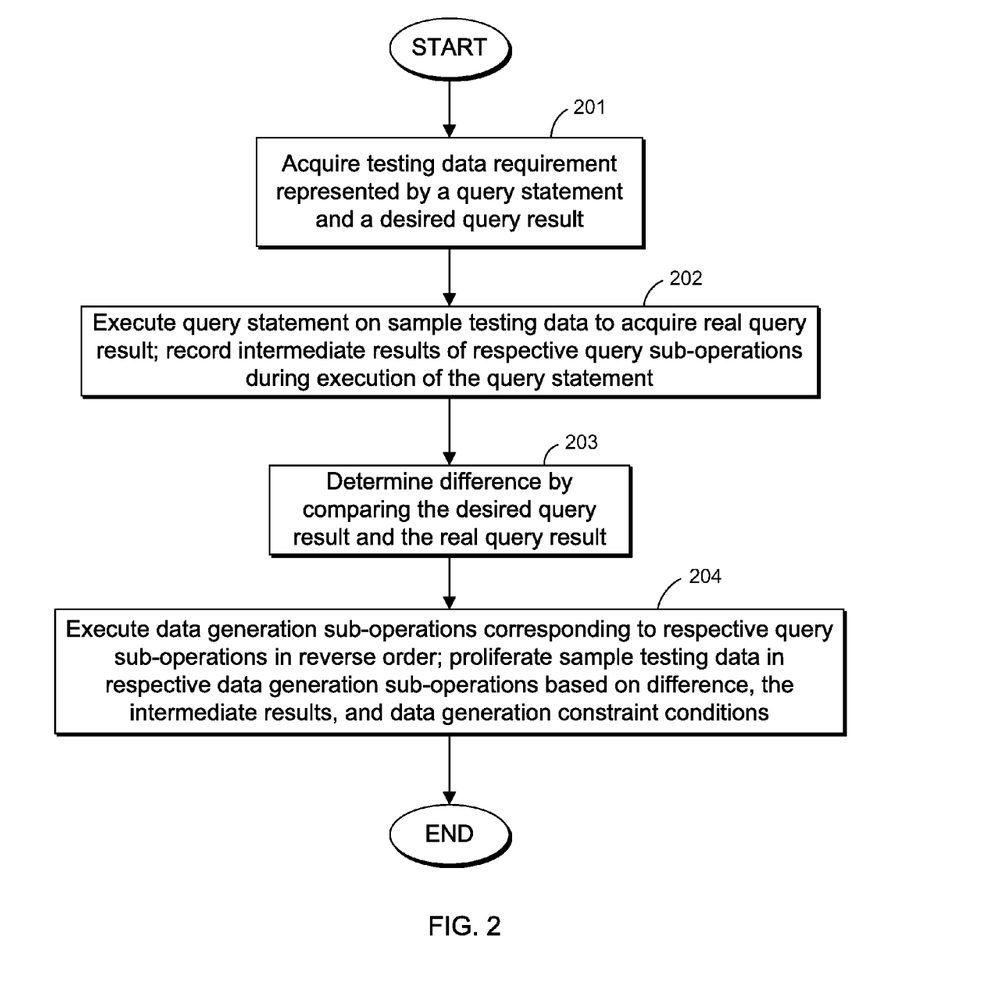
FIG. 2 shows a flowchart of a method for proliferating testing data according to an embodiment of the invention.

With reference now to FIG. 2, a flowchart of a method for proliferating testing data according to an embodiment of the invention is shown. In this embodiment, which can proliferate sample testing data having a specific pattern to generate new testing data. As shown in FIG. 2, the method comprises the following steps.

In step 201, a testing data requirement is acquired, where the testing data requirement is represented by a query statement and a desired query result.

Figure 3:
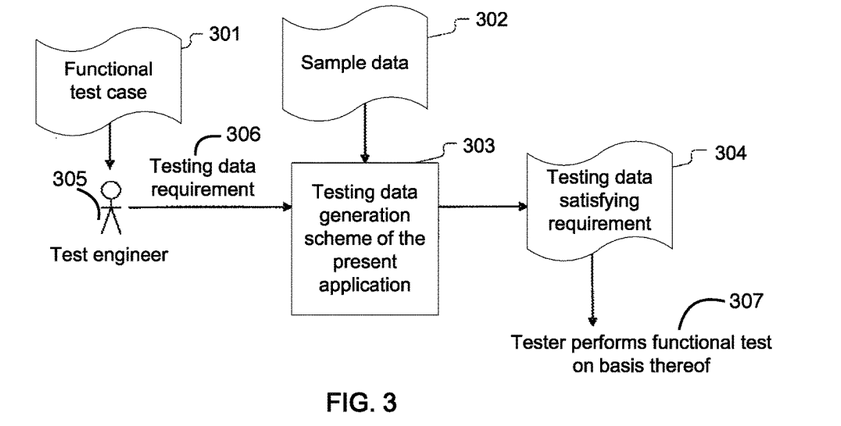
FIG. 3 is a diagram showing an example testing flow according to an embodiment of the invention.

This step will now be described in conjunction with FIG. 3, which shows an example of a testing flow in accordance with an embodiment of the present invention. As shown in FIG. 3, functional test case 301 is a specific test flow designed based on information such as a test requirement or software acceptance criteria, which is generally a set of test inputs, execution conditions and desired result formulated for certain program functions. Further, a test engineer 305 determines a testing data requirement 306 by analyzing the functional test case 301, i.e., a specific requirement of the functional test case on testing data. For example, when testing a vehicle driver ranking function, in order to take into account drivers with different skill levels during ranking, it may be required in the testing data requirement that there are provided data records of two drivers on June 2012, and that fuel consumption of the second driver is lower than that of the first driver by 25%. Block 303 represents a testing data generation scheme of the present invention, which, based on sample data 302 and testing data requirement 306, generates testing data that satisfies the requirement (304). A tester then performs a functional test on the basis of the testing data (307).

Step 201 is characterized in that, the testing data requirement is represented by a computer readable query statement and desired query result. The testing data requirement stands for characteristics that should be possessed by testing data in a certain aspect. Here, the query statement is used to represent projection of the testing data to the concerned aspect, and the desired query result is used to represent the above characteristics that should be possessed. The query statement may be expressed by any programming language. In an embodiment, an SQL statement is used. In addition, those skilled in the art may employ other computer readable manners to represent a query statement. In another embodiment, requirement projection may be written into the query statement as much as possible, while a simple data characteristics is represented by desired query result. This can further improve efficiency in generating the testing data requirement.

Figure 4:
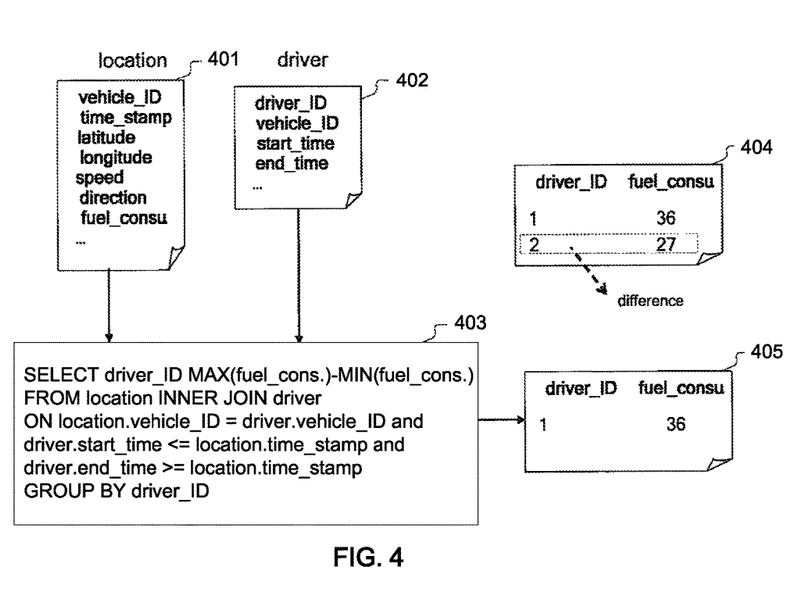
FIG. 4 is a diagram showing a query statement and desired query result according to an embodiment of the invention.

FIG. 4 shows an example of a query statement and desired query result, in which block 403 shows a query statement described by SQL statement and block 404 shows an example of a desired query result. The desired query result is generally a table. When a query statement is set, the fields which will be contained in the table of the desired query result are determined. For example, based on the query statement in block 403 of FIG. 4, it can be determined that the desired query result in block 404 includes two fields: driver_ID, and fuel_consu. Further, content of the desired query result also needs to be customized, such as values of respective fields of each piece of record, and the total number of records. The desired query result may be deterministic or fuzzy. In the example shown in FIG. 4, the desired query result has been determined to be values of specific fields, while in another embodiment, the desired query result may be an entry requirement, e.g., it is required that number of entries is not less than 5.

In another embodiment, the query statement may also be one or a set of programs, and the desired query result may be embodied as input data of a program or a profile run by the program. An output result of the program can be a difference acquired by comparing a real query result and the desired query result in a subsequent step.

Sample testing data is real data from one or more actual application scenarios, and is generally considered as a set of homogeneous data records, each of which contains a plurality of fields. For example, vehicle trajectory is comprised of a series of coordinate points, each of which is a piece of record including fields such as time, longitude, latitude, speed, direction, etc. The sample testing data may be stored in the form of a data table, or may also use non-database structured data such as text. If sample testing data is non-structured data, it also needs to be processed into structured data.

Returning to the method shown in FIG. 2, in step 202, the query statement is executed on sample testing data to acquire a real query result, and intermediate results of respective query sub-operations during execution of the query statement are recorded.

The query statement is executed on sample testing data by using a query engine and a real query result is outputted. When the query statement is a SQL statement, the query engine may be any existing SQL processing engine. Then, with reference to the embodiment of FIG. 4, block 405 shows a real query result generated after executing the query statement shown in block 403 on sample testing data, including the location table and driver table. FIG. 4 also shows the fields included in the location table 401 and driver table 402, respectively.

When executing a query statement, a query engine generally will decompose (i.e., parse) the query statement into a series of elementary sub-operations, such as select, project, join in relational algebra and an aggregate function widely used in database query languages. When executing a query statement, almost all query engines will decompose the query statement into such elementary sub-operations, and then execute these sub-operations in certain order, and the execution order of different engines may be different. Intermediate results are output results corresponding to input of each query sub-operation while a query is executed. Those skilled in the art may use any existing method to record the intermediate results, such as in form of a data table. In order to record intermediate results, code may be added to an existing process engine to enable it to record intermediate results during execution of the query statement, so as to be used in a subsequent step. Further, with reference to an embodiment of a query statement execution and data generation process shown in FIG. 5, a thick arrow on the left shows the execution process of the query statement in block 403 of FIG. 4, in which the process in turn includes a join sub-operation "θ location.vehicle_ID=driver.vehicle_ID", a select sub-operation "σ start_time<=time_stamp and end_time>=time_stamp", a project sub-operation "π driver_ID, fuel_consumption", and an aggregate sub-operation "γ driver_ID(fuel_consumption)".

In step 203 shown in FIG. 2, a difference is determined by comparing the desired query result and the real query result. If there is no difference, it means that the sample testing data meets testing data requirements and there is no need for a subsequent step of proliferating the sample testing data. If there is difference, it means that the sample testing data does not meet with testing data requirements, and there is a need to proliferate the sample testing data to generate new testing data that complies with the requirements.

In this embodiment, the real query result and desired query result have the same form structure; therefore, when performing the comparison, for each piece of record in the desired query result, if there is no record in the real query result that matches that piece of record, then that piece of record is taken as a piece of record in the difference. Thus, each piece of record in the difference represents a record missing in the real query result. Testing data is preferably proliferated such that all records in the difference may be acquired by executing the query statement on the proliferated testing data. In this embodiment, a piece of record in the real query result matching with a piece of record in desired query result refers to the case in which values of respective fields in the two pieces of records are identical. With reference to the embodiment of FIG. 4, the portion surrounded by dashed line box in 404 represents the difference determined by the comparison.

In step 204, respective data generation sub-operations corresponding to respective query sub-operations are executed in an order that is reverse to the execution order of the query statement, and the sample testing data is proliferated in the respective data generation sub-operations based on the difference, the intermediate results, and data generation constraint conditions corresponding to respective fields in the sample testing data, wherein at least one of the data generation constraint conditions reflects a specific pattern of a corresponding field.

When generating new testing data, a record missing in the real query result is represented by the difference acquired through comparison in the foregoing step. Thus, in step 204, each piece of missing record in the difference needs to be taken as a clue to execute respective data generation sub-operations corresponding to respective query sub-operations in an order that is reverse to the execution order of the query statement.

In each data generation sub-operation, there is a current difference determined based on the foregoing difference, then, a proliferation operation is performed in each data generation sub-operation based on that current difference, the recorded intermediate results of respective query sub-operations, and data generation constraint conditions of respective fields. Finally, new testing data can be generated such that the desired query result can be acquired by executing the query statement on the newly generated testing data.

The difference will be taken as a current difference and the difference together with query result of the last query sub-operation in the query statement will be taken as input to a current data generation sub-operation, if the current data generation sub-operation corresponds to the last query sub-operation. In fact, each data generation sub-operation can be the first one (corresponding to the last query sub-operation of the query statement), and each will be described hereinafter.

If the first data generation sub-operation is an aggregate generation sub-operation, then for each piece of record in the current difference, the following is performed: determining, based on an intermediate result of the aggregate query sub-operation corresponding to the aggregate generation sub-operation, a current correlation record for that piece of record in the current difference among an output result of the aggregate query sub-operation; determining, based on an intermediate result of the aggregate query sub-operation, a current corresponding record of the current correlation record among input data of the aggregate query sub-operation; replicating the current corresponding record, and modifying the replicated current corresponding record based on data generation constraint conditions of respective fields in the current corresponding record and type of aggregate generation sub-operation; taking all of the modified and replicated current corresponding records together with input data of the aggregate query sub-operation as output of the aggregate generation sub-operation, wherein output of that aggregate generation sub-operation is taken as input to a next data generation sub-operation, all of the modified replicated current corresponding records are taken as a current difference in input to the next data generation sub-operation, and a current corresponding record resulting from that aggregate generation sub-operation is taken as a current correlation record in the next data generation sub-operation.

If the first data generation sub-operation is a project generation sub-operation, then for each piece of record in the current difference, the following is performed: determining, based on an intermediate result of a project query sub-operation corresponding to the project generation sub-operation, a current correlation record for that piece of record in the current difference among output results of the project query sub-operation; determining, based on an intermediate result of the project query sub-operation, a current corresponding record of the current correlation record among input data of the project query sub-operation; complementing fields missing in that piece of record in the current difference based on the current corresponding record, and modifying the complemented record based on data generation constraint conditions of respective fields; taking all of the complemented and modified records together with input data of the project query sub-operation as output of the project generation sub-operation, wherein output of that project generation sub-operation becomes input to a next data generation sub-operation, all of the complemented and modified records become a current difference in input to a next data generation sub-operation, and a current corresponding record resulted from that current project generation sub-operation becomes a current correlation record in input to a next data generation sub-operation.

If the first data generation sub-operation is a select generation sub-operation, then the following is performed: determining, based on an intermediate result of a select query sub-operation corresponding to the select generation sub-operation, a current correlation record for the records in the current difference among an output result of the select query sub-operation; taking input to the select generation sub-operation directly as output of the select generation sub-operation, wherein that output becomes input to a next data generation sub-operation, and the current difference and the current correlation record in the input to the select generation sub-operation become a current difference and current correlation record in input to a next data generation sub-operation.

If the first data generation sub-operation is a join generation sub-operation, then the following is performed: determining, based on an intermediate result of a join query sub-operation corresponding to the join generation sub-operation, a current correlation record for records in the current difference among an output result of the join query sub-operation; executing a reverse operation of the join sub-operation on input of the join generation sub-operation to generate output of the join generation sub-operation, wherein that output becomes input to a next data generation sub-operation, and the current difference and the current correlation record in the input to the join generation sub-operation become a current difference and current correlation record in input to a next data generation sub-operation.

Each field has a corresponding data generation constraint condition, which means for different types of data, an operation constraint is different when performing data proliferation. In order to consider internal relationships of testing data, at least one data generation constraint condition reflects a specific pattern of a corresponding field. Next, a detailed discussion will be made through an example embodiment containing three types of data: A, B, and C.

In this embodiment, there is a complex strong coupling relation (e.g., strong temporal-spatial relation) for a data field of type A or among data fields of type A. Since fields are closely coupled, data generation for this type of data field has a relatively small degree of freedom. A data generation constraint condition for this type of data may comprise operations capable of reflecting the strong coupling relation of data of type A, such as block duplication, block concatenation, data scaling, time shift, etc. For example, for vehicle trace data, fields such as longitude, latitude, speed, direction, mileage, etc. have strong temporal-spatial correlation. It may be specified in a data constraint condition that, for data of these five fields, temporal-spatial correlation among these fields can only be guaranteed via block duplication operations.

In this embodiment, there is a simple coupling relation (e.g., relatively weak temporal-spatial correlation) for data fields of type B, among data fields of type B, or with data fields of type A. Since the coupling relation is relatively simple, the coupling relation may be modeled and added into a data generation algorithm, such that data generation for this type of field has relatively high flexibility. A data generation constraint condition for this type of data may comprise: scale-up or scale-down in data values. For example, fuel consumption has a relatively weak temporal-spatial correlation, and can only be incremented over time. Thus, allowed operation on fuel consumption may be a scale-up operation.

In this embodiment, there is no correlation between data fields of type C and other fields, or the correlation is negligible, such as without any temporal-spatial correlation. Thus, a data generation constraint condition for this type of data may be the most flexible. Data of this type of field may be assigned an arbitrary value in data proliferation. For example, driver identification information, vehicle identification code, etc. may be randomly generated.

When generating new data, a data generation constraint condition for data fields with relatively strong coupling relations may of course be implemented on data fields with relatively weak coupling relation, but not vice versa.

The above classification of fields is merely illustrative; the final purpose is to bind a set of operations (i.e., with a data generation constraint condition) that may be implemented in generating new data for each field or each set of fields. On the basis of the information disclosed in the present application, other classification manners will be readily apparent to those skilled in the art.

Next, generation of new testing data in an order that is reverse to the execution order of the query statement in step 204 of FIG. 2 will be described in conjunction with FIG. 5.

A forward query operation is a process of executing a query statement on sample testing data and acquiring a real query result, whereas a reverse generation operation is a process of generating testing data in an order that is reverse to the forward query operation. In the present application, a sub-operation in the reverse generation operation is referred to as current sub-operation, and each current sub-operation has a corresponding query sub-operation.

Figure 5:
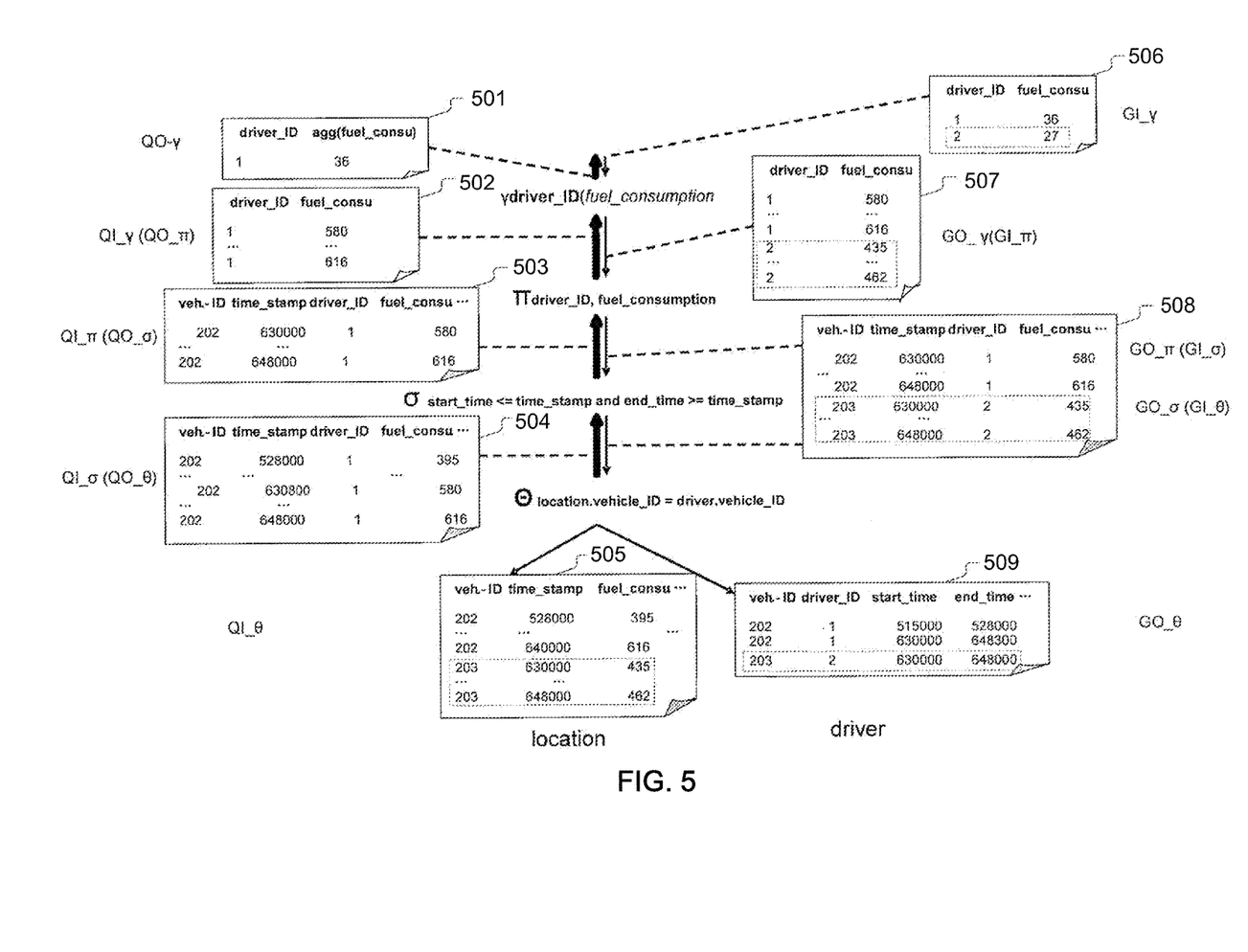
FIG. 5 is a diagram showing query statement execution and data generation flow according to an embodiment of the invention.

With reference to the embodiment shown in FIG. 5, query operations shown by thick arrows on the left sequentially comprise (from bottom to top): a join sub-operation θ, a select sub-operation α, a project sub-operation π, and an aggregate sub-operation γ. The thin arrows on the right of the thick arrows show the process for reverse data generation operations, wherein each data generation sub-operation has a corresponding query sub-operation. It should be noted that FIG. 5 illustratively shows a common order, but in practice, another order may be used, or only one or more sub-operations therein may be used, all of which will be readily apparent to those skilled in the art based on the information disclosed in the present application; therefore, detailed discussion of all implementations thereof will be omitted herein.

Input data of each query sub-operation is represented by QI, and output data thereof is represented by QO. For example, blocks 505 and 509 show input QI_θ of the join sub-operation (excluding data in dashed line box), block 504 shows output QO_θ of the join sub-operation, and block 504 is also an input QI_σ to a subsequent selection operation σ. In the same way, FIG. 5 also shows input and output of other query sub-operations (blocks 501-503), which will not be described one by one. Input data of each data generation sub-operation is represented by GI, and an output result thereof is represented by GO. For example, block 506 shows input GI_γ of a generation sub-operation γ, and block 507 shows output GO_γ of the generation sub-operation γ. Block 507 is also an input GI_π to a subsequent generation sub-operation π. In this embodiment, input GI of each data generation sub-operation comprises an output result of a corresponding query sub-operation (represented by QO) and a difference part (represented by NEW). Dashed line boxes are used in blocks 506, 507 and 508 of FIG. 5 to represent difference parts in input data of corresponding data generation sub-operations. As to the first data generation sub-operation, the difference part is just that acquired through comparison in step 203. Thus, for each data generation sub-operation, it turns into how to generate GO based on GI (including QO and NEW) and QI. The finally generated new testing data is an output of the last data generation sub-operation, e.g., two data tables shown in blocks 505 and 509 of FIG. 5 (including data in dashed line box).

(1) If a current data generation sub-operation is an aggregate generation sub-operation, then for each piece of record in the difference (such as the record in dashed line box of block 506), the following steps are performed.

Determining, based on an intermediate result of an aggregate query sub-operation corresponding to the aggregate generation sub-operation, a current correlation record for that piece of record in the difference among an output result (QO_γ) of the corresponding aggregate query sub-operation. Any pieces of record may be selected for correlation, and in one embodiment, a piece of record in QO_γ may also be selected to establish a correlation therewith based on a principle of maximum similarity.

Determining, based on an intermediate result of the aggregate query sub-operation, a corresponding record (current corresponding record) of that current correlation record among input data (QI_γ) of the aggregate query sub-operation, i.e., a set of records in QI_γ that generate that current correlation record.

Replicating the current corresponding record, and modifying the replicated current corresponding record based on data generation constraint conditions of respective fields in that current corresponding record and type of aggregate generation sub-operation. Through modification, when a corresponding aggregate query sub-operation is executed on the modified and replicated corresponding record, an output result is able to contain that piece of record in the difference. A specific type of aggregate operation may be, for example, min, max, count, etc. Different data fields and corresponding data generation constraint conditions have been described hereinabove and will be omitted here for brevity.

When all of the records in the difference have been processed, all of the modified replicated corresponding records are taken together with input data (QI_γ) of the corresponding query sub-operation as output (GO_γ) of the aggregate generation sub-operation.

Then, all of the modified replicated corresponding records are taken as a current difference in a next data generation sub-operation, the replicated original corresponding record is taken as a corresponding correlation record in input to a next data generation sub-operation, and input data (QI_γ) of a corresponding query sub-operation is taken as an output result (QO_π) of a corresponding query sub-operation in a next data generation sub-operation.

(2) If a current data generation sub-operation is a project generation sub-operation π, output of a previous aggregate generation sub-operation is taken as input to the project generation sub-operation, all of the above modified replicated corresponding records are taken as a current difference in input to that project generation sub-operation, the replicated original corresponding record is taken as a current correlation record in input to that project generation sub-operation, and input data of a previous aggregate query sub-operation is taken as output of the project query sub-operation.

A piece of record is acquired in a current difference. Then, for each piece of record, the following steps are performed:

Determining, based on a current correlation record corresponding to that piece of record and an intermediate result of that project query sub-operation, a current corresponding record of that current correlation record among input data (QI_π) of the project query sub-operation, i.e., a set of records in QI_π that generate that current correlation record.

Fields missing in that piece of record in the current difference are complemented based on the current corresponding record, and the complemented record is modified based on data generation constraint conditions of respective fields. Through modification, when a corresponding project query sub-operation is executed on the complemented and modified record, an output result is able to contain that piece of record in a current difference.

When all of the records in the difference have been processed, all of the complemented and modified records are taken together with input data (QI_π) of the project query sub-operation as output (GO_π) of that project generation sub-operation.

Then, all of the complemented and modified corresponding records are taken as a difference part in a next data generation sub-operation, and the difference part together with input data (QI_π) of a corresponding query sub-operation are taken as an output result (QO_σ) of a corresponding query sub-operation in a next data generation sub-operation. A corresponding record resulting from the current project generation sub-operation is taken as a corresponding correlation record in input to a next data generation sub-operation.

(3) If a current sub-operation is a select generation sub-operation σ, then output of a previous data generation sub-operation is taken as input of the select generation sub-operation, and input data (GI_σ) of that current data generation sub-operation is taken directly as output (GO_σ) of that current data generation sub-operation and it is also input (GI_θ) to a next data generation sub-operation θ.

(4) If current sub-operation is a join operation θ, then output of a previous data generation sub-operation is taken as input to the join generation sub-operation, and a reverse operation of the join sub-operation is performed on input data (GI_θ) of that current data generation sub-operation. For example, in the embodiment of FIG. 5, input data (GI_θ) is decomposed into two data tables shown at blocks 505 and 509 as final output (GO_θ).

Figure 6:
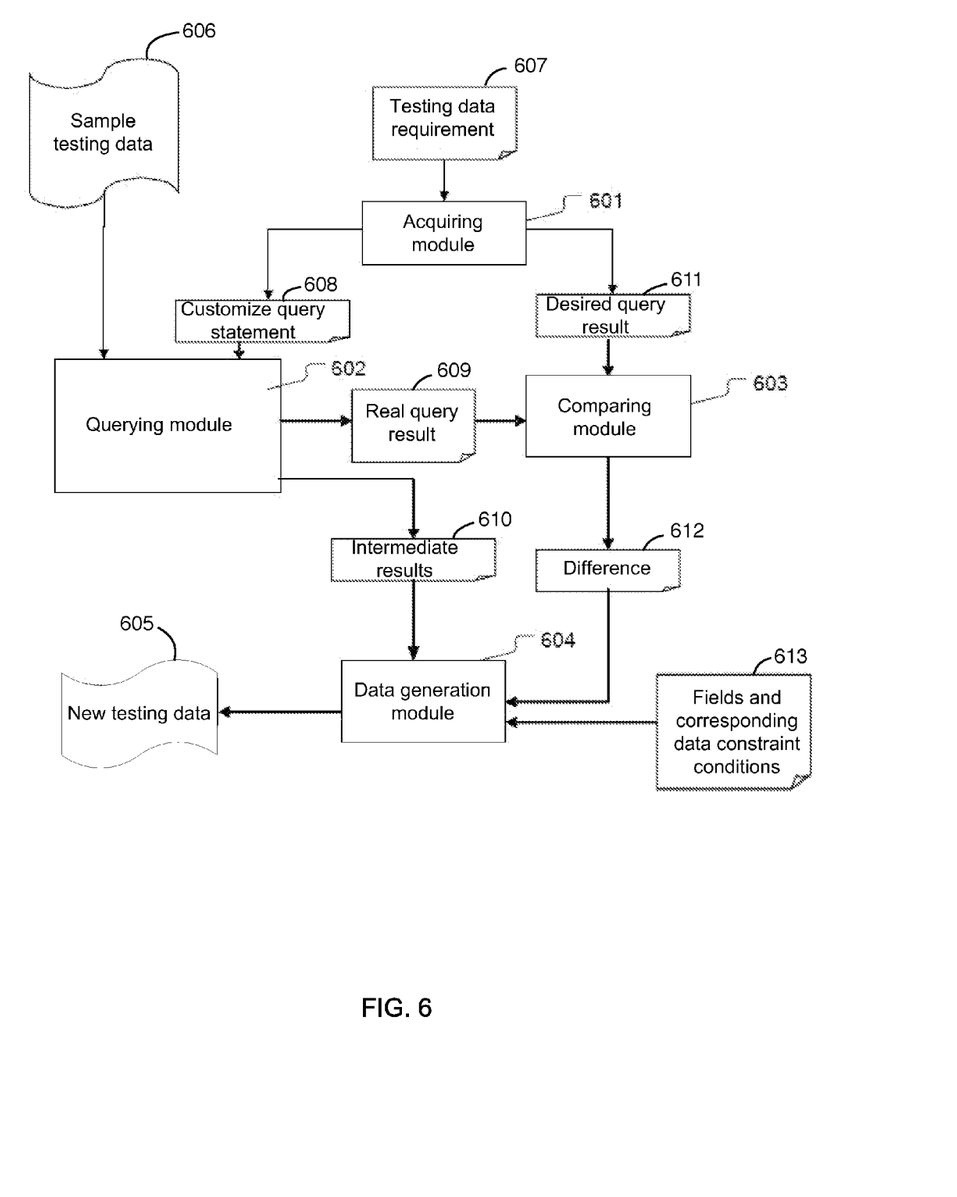
FIG. 6 shows a diagram of an information processing system for proliferating testing data according to an embodiment of the invention.

FIG. 6 shows an information processing system for proliferating testing data according to an embodiment of the invention, which can proliferate new testing data 605 based on sample testing data 606. The information processing system of FIG. 6 comprises: an acquiring module 601 configured to acquire testing data requirement 607 represented by a query statement 608 and a desired query result 611; a querying module 602 configured to execute the query statement 608 on sample testing data 606 to acquire a real query result 609, and record intermediate results 610 of respective query sub-operations during execution of the query statement 608; a comparing module 603 configured to determine a difference 612 by comparing the desired query result 611 and the real query result 609; a data generation module 604 configured to execute respective data generation sub-operations corresponding to respective query sub-operations in an order that is reverse to the execution order of the query statement 608, and proliferate the sample testing data in the respective data generation sub-operations based on the difference 612, the intermediate results 610, and data generation constraint conditions corresponding to respective fields in the sample testing data (613), wherein at least one of the data generation constraint conditions reflects a specific pattern of a corresponding field.

In one embodiment, the data generation module 604 comprises: a module configured to take the difference as a current difference and take the difference together with a query result of the last query sub-operation in the query statement as input to a current data generation sub-operation, if the current data generation sub-operation corresponds to the last query sub-operation.

In one embodiment, if the current data generation sub-operation is an aggregate generation sub-operation, the data generation module 604 further comprises: a module configured to, for each piece of record in the current difference, determine, based on an intermediate result of an aggregate query sub-operation corresponding to the aggregate generation sub-operation, a current correlation record for that piece of record in the current difference among an output result of the aggregate query sub-operation; determine, based on an intermediate result of the aggregate query sub-operation, a current corresponding record of the current correlation record among input data of the aggregate query sub-operation; and replicate the current corresponding record, and modify the replicated current corresponding record based on data generation constraint conditions of respective fields in the current corresponding record and type of aggregate generation sub-operation; and a module configured to take all of the modified and replicated current corresponding records together with input data of the aggregate query sub-operation as output of the aggregate generation sub-operation, wherein output of that aggregate generation sub-operation is taken as input to a next data generation sub-operation, all of the modified replicated current corresponding records are taken as a current difference in input to the next data generation sub-operation, and a current corresponding record resulting from that aggregate generation sub-operation is taken as a current correlation record in a next data generation sub-operation.

In another embodiment, if the current data generation sub-operation is a project generation sub-operation, the data generation module 604 further comprises: a module configured to, for each piece of record in the current difference, determine, based on an intermediate result of a project query sub-operation corresponding to the project generation sub-operation, a current correlation record for that piece of record in the current difference among output results of the project query sub-operation; determine, based on an intermediate result of the project query sub-operation, a current corresponding record of the current correlation record among input data of the project query sub-operation; complement fields missing in that piece of record in the current difference based on the current corresponding record, and modify the complemented record based on data generation constraint conditions of respective fields; and a module configured to take all of the complemented and modified records together with input data of the project query sub-operation as output of the project generation sub-operation, wherein output of that project generation sub-operation becomes input to a next data generation sub-operation, all of the complemented and modified records become a current difference in input to a next data generation sub-operation, and a current corresponding record resulting from that current project generation sub-operation becomes a current correlation record in input to a next data generation sub-operation.

In an embodiment, if the current data generation sub-operation is a select generation sub-operation, the data generation module 604 further comprises: a module configured to determine, based on an intermediate result of a select query sub-operation corresponding to the select generation sub-operation, a current correlation record for records in the current difference among an output result of the select query sub-operation; and a module configured to take input to the select generation sub-operation directly as output of the select generation sub-operation, wherein that output becomes input to a next data generation sub-operation, and the current difference and the current correlation record in the input to the select generation sub-operation become a current difference and current correlation record in input to a next data generation sub-operation.

In an embodiment, if the current data generation sub-operation is a join generation sub-operation, the data generation module 604 further comprises: a module configured to determine, based on an intermediate result of a join query sub-operation corresponding to the join generation sub-operation, a current correlation record for records in the current difference among an output result of the join query sub-operation; and a module configured to execute a reverse operation of the join sub-operation on input of the join generation sub-operation to generate output of the join generation sub-operation, wherein that output becomes input to a next data generation sub-operation, and the current difference and the current correlation record in the input to the join generation sub-operation become a current difference and current correlation record in input to a next data generation sub-operation.

In another embodiment, the current correlation record is determined by principle of maximum similarity.

In an embodiment, the querying module 602 further comprises: a module configured to, for each piece of record in the desired query result, take that piece of record as a piece of record in the difference if a matching record is not found in the real query result.

In an embodiment, the information processing system for generating testing data as shown in FIG. 6 further comprises: a module configured to find a next select sub-operation in reverse order of the query operation, if the real query result is null; and a module configured to adjust a condition of the found select sub-operation, re-execute the query operation until a non-null query result is acquired, and take the non-null query result as the real query result.

In the above embodiments, technical solutions of the present application has been described by taking Internet of Vehicle (IOV) as an example; however, those skilled in the art can apply the technical solutions of the present application in other scenarios on basis thereof. For example, the technical solutions of the present application may be applied in analysis and management of a pipe network (e.g., location, model, installation time, pressure measurement over time of valves of tap water or oil and gas pipelines, etc.). Technical solutions of the present application may also be applied to scenarios involving big data analysis applications within a smart power grid (e.g., speed/output power of a generator, instant voltage/current/effective power of a transformer station, etc.). In summary, with the technical solutions of the present application, new testing data complying with actual physical characteristics may be generated based on sample testing data.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A computer program product for proliferating testing data, the computer program product comprising a computer readable storage medium having program instructions embodied therewith, the program instructions executable by a processor device to cause the processor device to perform a method comprising:

acquiring a testing data requirement represented by a query statement and a desired query result;

executing the query statement on sample testing data to acquire a real query result, and recording intermediate results of respective query sub-operations during execution of the query statement;

determining a difference by comparing the desired query result and the real query result; and executing respective data generation sub-operations corresponding to respective query sub-operations in an order that is reverse to an execution order of the query statement, and proliferating the sample testing data in the respective data generation sub-operations based on the difference, the intermediate results and data generation constraint conditions corresponding to respective fields in the sample testing data, wherein at least one of the data generation constraint conditions reflects a specific pattern of a corresponding field.

2. The computer program product according to claim 1, wherein the step of executing respective data generation sub-operations corresponding to respective query sub-operations in an order that is reverse to an execution order of the query statement, and proliferating the sample testing data in the respective data generation sub-operations based on the difference, the intermediate results and data generation constraint conditions corresponding to respective fields in the sample testing data comprises:

taking the difference as a current difference and taking the difference together with a query result of a last query sub-operation in the query statement as input to a current data generation sub-operation, if the current data generation sub-operation corresponds to the last query sub-operation.

3. The computer program product according to claim 2, wherein the current data generation sub-operation is an aggregate generation sub-operation, and the step of proliferating the sample testing data further comprises:

for each piece of record in the current difference:
      determining based on an intermediate result of an aggregate query sub-operation corresponding to the aggregate generation sub-operation, a current correlation record for the piece of record in the current difference among an output result of the aggregate query sub-operation;
      determining based on an intermediate result of the aggregate query sub-operation, a current corresponding record of the current correlation record among input data of the aggregate query sub-operation;
      replicating the current corresponding record, and modifying the replicated current corresponding record based on data generation constraint conditions of respective fields in the current corresponding record and type of aggregate generation sub-operation; and
      taking all of the modified and replicated current corresponding records together with input data of the aggregate query sub-operation as output of the aggregate generation sub-operation, wherein output of the aggregate generation sub-operation is taken as input to a next data generation sub-operation, all of the modified replicated current corresponding records are taken as a current difference in input to the next data generation sub-operation, and a current corresponding record resulting from the aggregate generation sub-operation is taken as a current correlation record in the next data generation sub-operation.

4. The computer program product according to claim 2, wherein the current data generation sub-operation is a project generation sub-operation, and the step of proliferating the sample testing data further comprises:

for each piece of record in the current difference:

determining based on an intermediate result of a project query sub-operation corresponding to the project generation sub-operation, a current correlation record for the piece of record in the current difference among output results of the project query sub-operation;

determining based on an intermediate result of the project query sub-operation, a current corresponding record of the current correlation record among input data of the project query sub-operation;

complementing fields missing in the piece of record in the current difference based on the current corresponding record, and modifying the complemented record based on data generation constraint conditions of respective fields; and         taking all of the complemented and modified records together with input data of the project query sub-operation as output of the project generation sub-operation, wherein output of the project generation sub-operation becomes input to a next data generation sub-operation, all of the complemented and modified records become a current difference in input to the next data generation sub-operation, and a current corresponding record resulting from the project generation sub-operation becomes a current correlation record in input to the next data generation sub-operation.

5. The computer program product according to claim 2, wherein the current data generation sub-operation is a select generation sub-operation, and the step of proliferating the sample testing data further comprises:

determining based on an intermediate result of a select query sub-operation corresponding to the select generation sub-operation, a current correlation record for records in the current difference among an output result of the select query sub-operation; and     taking input to the select generation sub-operation directly as output of the select generation sub-operation, wherein the output becomes input to a next data generation sub-operation, and the current difference and the current correlation record in the input to the select generation sub-operation become a current difference and current correlation record in input to the next data generation sub-operation.

6. The computer program product according to claim 2, wherein the current data generation sub-operation is a join generation sub-operation, and the step of proliferating the sample testing data further comprises:

determining based on an intermediate result of a join query sub-operation corresponding to the join generation sub-operation, a current correlation record for records in the current difference among an output result of the join query sub-operation; and     executing a reverse operation of the join sub-operation on input of the join generation sub-operation to generate output of the join generation sub-operation, wherein the output becomes input to a next data generation sub-operation, and the current difference and the current correlation record in the input to the join generation sub-operation become a current difference and current correlation record in input to the next data generation sub-operation.

7. The computer program product according to claim 2, wherein the current correlation record is determined by principle of maximum similarity.

8. The computer program product according to claim 1, wherein the step of determining a difference by comparing the desired query result and the real query result comprises:

for each piece of record in the desired query result, taking the piece of record as a piece of record in the difference if a matching record is not found in the real query result.

9. The computer program product according to claim 1, further comprising:

finding a next select sub-operation in reverse order of an execution order of the query statement, if the real query result is null; and     adjusting a condition of the found select sub-operation, re-executing the query statement until a non-null query result is acquired, and taking the non-null query result as the real query result.

\* \* \* \* \*